US010834532B2

United States Patent
Fuerst et al.

(10) Patent No.: US 10,834,532 B2
(45) Date of Patent: Nov. 10, 2020

(54) METHOD AND SYSTEM FOR WIRELESS LOCALIZATION DATA ACQUISITION AND CALIBRATION WITH IMAGE LOCALIZATION

(71) Applicant: NEC Laboratories Europe GmbH, Heidelberg (DE)

(72) Inventors: Jonathan Fuerst, Heidelberg (DE); Guerkan Solmaz, Heidelberg (DE); Ernoe Kovacs, Stuttgart (DE); Kaifei Chen, Berkeley, CA (US)

(73) Assignee: NEC LABORATORIES EUROPE GMBH, Heidelberg (DE)

( * ) Notice: Subject to any disclaimer, the term of this patent is extended or adjusted under 35 U.S.C. 154(b) by 0 days.

(21) Appl. No.: 16/548,870

(22) Filed: Aug. 23, 2019

(65) Prior Publication Data

US 2020/0068344 A1  Feb. 27, 2020

Related U.S. Application Data

(60) Provisional application No. 62/721,652, filed on Aug. 23, 2018.

(51) Int. Cl.
*H04W 4/00* (2018.01)
*H04W 4/02* (2018.01)
*G06T 7/73* (2017.01)

(52) U.S. Cl.
CPC .............. *H04W 4/023* (2013.01); *G06T 7/75* (2017.01); *G06T 2207/10024* (2013.01); *G06T 2207/10028* (2013.01)

(58) Field of Classification Search
CPC ..................... H04W 4/023; G06T 7/75; G06T 2207/10024; G06T 2207/10028
See application file for complete search history.

(56) References Cited

U.S. PATENT DOCUMENTS

| 8,971,612 | B2 | 3/2015 | Shotton et al. |
| 9,400,930 | B2 * | 7/2016 | Moeglein ............... H04W 4/029 |
| 9,934,587 | B2 | 4/2018 | Senthamil |
| 2012/0300020 | A1 | 11/2012 | Arth et al. |
| 2014/0335893 | A1 | 11/2014 | Ronen |

(Continued)

OTHER PUBLICATIONS

Yang, Zheng et al. "Locating in Fingerprint Space: Wireless Indoor Localization with Little Human Intervention," MobiCom '12, Aug. 22-26, 2012.

(Continued)

*Primary Examiner* — Julio R Perez
(74) *Attorney, Agent, or Firm* — Leydig, Voit & Mayer, Ltd.

(57) ABSTRACT

A method performs wireless localization data acquisition and calibration using a visual 3D model. The method includes: receiving image data and transmitter measurement data from a device; localizing the image data in the visual 3D model to determine a device location in a physical space; and using the device location and the transmitter measurement data to perform at least one of: determining transmitter fingerprint localization data and storing the transmitter fingerprint localization data in a fingerprint database; or calibrating a radio frequency (RF) propagation model for proximity estimation.

15 Claims, 12 Drawing Sheets
(3 of 12 Drawing Sheet(s) Filed in Color)

(56) References Cited

U.S. PATENT DOCUMENTS

2015/0094089 A1    4/2015  Moeglein et al.
2018/0143756 A1*  5/2018  Mildrew .................. G06F 3/011
2019/0026956 A1*  1/2019  Gausebeck .......... H04N 13/246
2019/0371067 A1* 12/2019  Simari .................. G06T 19/006

OTHER PUBLICATIONS

Dong, Jiang et al. "iMoon: Using Smartphones for Image-based Indoor Navigation," SenSys '15, Nov. 1-4, 2015.
Chen, Kaifei et al. "SnapLink: Fast and Accurate Vision-Based Appliance Control in Large Commercial Buildings," Proceedings of the ACM on Interactive, Mobile, Wearable and Ubiquitous Technologies, vol. 1, No. 4, Article 129, Dec. 2017.
Agarwal, Sameer et al. "Building Rome in a Day," ICCV, Sep. 2009.
Bolliger, Philipp, "Redpin-Adaptive, Zero-Configuration Indoor Localization through User Collaboration," MELT '08, Sep. 19, 2008.
He, Xiang et al. "Portable 3D Visual Sensor Based Indoor Localization on Mobile Device," CCNC, Jan. 2016.
Clark, Ronald et al. "Increasing the Efficiency of 6-DoF Visual Localization Using Multi-Modal Sensory Data," IEEE-RAS $16^{th}$ International Conference on Humanoid Robots, Nov. 15-17, 2016.
Liang, Jason Zhi et al. "Image Based Localization in Indoor Environments," Jul. 22, 2013.
Middelberg, Sven et al. "Scalable 6-DOF Localization on Mobile Devices," ECCV 2014, Sep. 6, 2014.

* cited by examiner

METHOD AND SYSTEM FOR WIRELESS LOCALIZATION DATA ACQUISITION AND CALIBRATION WITH IMAGE LOCALIZATION

CROSS-REFERENCE TO PRIOR APPLICATIONS

Priority is claimed to U.S. Provisional Patent Application No. 62/721,652, filed on Aug. 23, 2018, the entire disclosure of which is hereby incorporated by reference herein.

FIELD

The present invention relates to a method and system for automated wireless localization data acquisition and calibration with image localization.

BACKGROUND

In mobile computing, radio frequency (RF) signals have been used extensively to enable localization and proximity detection. RF signals fade in space, the extent of signal fading being influenced by the physical characteristics of the space. As such, the Received Signal Strength Indicator (RSSI) measured at the receiver is a proxy for transmitter-receiver distance. Two common approaches make use of this RF signal fading behavior: (1) RSSI fingerprinting based localization and (2) RSSI based proximity estimation.

RSSI fingerprinting faces the problem that RSSI values need to be mapped to specific locations. Because the RF signal characteristics heavily depend on environment and transmitter/receiver characteristics, an explicit/implicit data acquisition, site-survey is required to build the initial fingerprinting database. This localization data acquisition is a hindrance for the proliferation of localization systems in practice. Likewise, for RSSI based proximity estimation, RSSI calibration to the deployment environment and transmitter/receiver characteristics (e.g., including hardware) is required to obtain accurate distance estimations.

SUMMARY

In an embodiment, a method is provided for performing wireless localization data acquisition and calibration using a visual 3D model. The method includes: receiving image data and transmitter measurement data from a device; localizing the image data in the visual 3D model to determine a device location in a physical space; and using the device location and the transmitter measurement data to perform at least one of: determining transmitter fingerprint localization data and storing the transmitter fingerprint localization data in a fingerprint database; or calibrating a radio frequency (RF) propagation model for proximity estimation.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
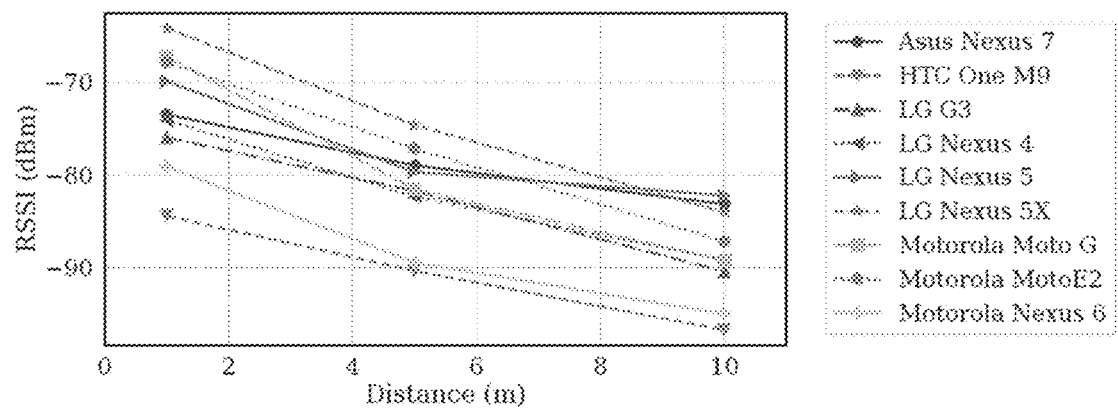
FIG. 1 illustrates a hardware heterogeneity problem, where different smartphone models exhibit greatly different RSSI measurements.

Embodiments of the present invention are directed to the fusion of physical knowledge—obtained through six degrees of freedom (6DOF) image localization and distance measurements from visual 3D models—with radio frequency (RF) data to: (1) automate (possibly crowd-sourced) acquisition of RSSI fingerprinting localization data; and (2) easily calibrate a RF propagation model for proximity estimation based on receiver and environment characteristics.

Radio frequency (RF) signals have been used to enable localization and proximity detection (e.g., indoors) based on Received Signal Strength Indication (RSSI). However, localization systems often suffer from large data collection and calibration overhead, especially when being deployed in a new environment. To overcome these problems, embodiments of the present invention provide the usage of visual 3D models that enable 6DOF localization and distance measurement with high accuracy. Embodiments then fuse this physical knowledge with RF data: (1) for automated acquisition of fingerprinting data and (2) easy calibration of a RF propagation model for proximity estimation.

Embodiments apply physical knowledge obtained from a 3D model (i.e., user location and transmitter-receiver distance) to address problems with conventional systems. Specifically, embodiments apply image localization in a visual 3D model to automate wireless localization data acquisition and calibration. Embodiments first combine vision based localization with RSSI fingerprinting, by providing a new technique for simple, explicit crowd-sourcing that (1) reduces the user effort, while (2) increasing the quality of the site survey data. Embodiments achieve this by combining the RSSI data collection with 6DOF image localization against a 3D model. In embodiments, the image localization removes the need for a manual location tagging by users and provides high localization accuracy. And second, embodiments provide for distance metrics obtained from a 3D model also to be used to calibrate automatically RSSI based proximity applications.

Experimental evaluations are provided for both application scenarios: (a) with an indoor localization system that uses Bluetooth Low Energy (BLE) fingerprinting; and (b) with a BLE proximity application that determines beacon-phone distances based on RSSIs of BLE advertisements.

Pure image localization is accurate, but has disadvantages as compared to the approach of vision supported RSSI based localization used by embodiments. Image localization is resource intensive, it can violate people's privacy requirements, and it requires explicit user involvement (i.e., camera actuation). On the other hand, RSSI based localization (e.g., proximity estimation) has advantages for privacy, latency, computational requirements, and mobile battery consumption.

Results show that image localization provides precise results (e.g., mean standard deviation at all locations: 5 cm) and accurate distance estimation (e.g., mean error: 33 cm) to automate localization data acquisition and calibration. For RSSI fingerprinting, embodiments can use image localization to construct a fingerprinting database that can exclusively be used for lightweight localization. Further, embodiments improve RSSI based proximity estimation error (e.g., from 3:3 m to 1:7 m) by using image localization to calibrate an RF signal propagation model to the specific phone and environment. These results open new avenues for crowd-sourced localization data acquisition and calibration approaches that now may build on Augmented Reality (AR) based interactions, such as smart appliance control to recruit participants.

Additionally, challenges faced by existing RF based localization, such as RSSI fingerprinting and proximity estimation, are overcome by the present invention.

RSSI fingerprinting usually follows two phases: (1) in the offline site survey phase, RSSI values of transmitters (e.g., WiFi access points, Bluetooth Beacons, etc.) are densely surveyed at known locations and stored in a database; (2) in the online phase, users of the localization system sample RSSI values with their devices, and the system compares user-sampled RSSI values with the values in the survey database according to a similarity metric (e.g., a Euclidean distance).

The site survey phase is a hindrance to fast adoption of these systems. As such, it is beneficial to reduce the involved efforts in the site survey phase, for example, through explicit and implicit crowdsourcing. In explicit crowdsourcing, users are requested to collect RSSI data at unexplored locations, e.g., using their mobile devices. Explicit crowdsourcing often suffers from poor quality of user input and difficulties to recruit participants. In implicit crowdsourcing, RSSI data is collected on user's devices without manual user intervention (e.g., in embodiments the effortless RSSI fingerprinting based indoor localization by combining an indoor floor map with RSSI and inertial data sampling with a particle filter). However, localization accuracy for implicit crowdsourcing systems is lower than traditional site survey based systems, while system complexity increases because of the required signal processing (e.g., noise reduction with filtering). See Yang et. al, "Locating in Fingerprint Space: Wireless Indoor Localization with Little Human Intervention," MobiCom'12 (Aug. 22-26, 2012) (the entire contents of which are hereby incorporated by reference herein).

Summarized, RSSI fingerprinting faces the following challenges: (1) slow adoption due to offline phase; (2) inaccurate user input for explicit crowdsourcing.

RSSI based proximity estimation relies on signal fading properties to estimate proximity based on the received signal strength. However, this proximity estimation is heavily influenced by environmental factors, such as obstacles, multipath effects, channel fading, or wireless interference. Thus, formulae for proximity estimation are usually based on both physical RF signal propagation (e.g., Friis transmission equation) and heuristics obtained experimentally to fit different physical environments and hardware.

In an embodiment, a method is provided for performing wireless localization data acquisition and calibration using a visual 3D model. The method includes: receiving image data and transmitter measurement data from a device; localizing the image data in the visual 3D model to determine a device location in a physical space; and using the device location and the transmitter measurement data to perform at least one of: determining transmitter fingerprint localization data and storing the transmitter fingerprint localization data in a fingerprint database; or calibrating a radio frequency (RF) propagation model for proximity estimation.

The transmitter fingerprint localization data can include an RSSI value of a transmitter determined by the device, device characteristics of the device, and the device location.

Localizing the image data, in an embodiment, includes performing six degrees of freedom (6DOF) image localization. The visual 3D model can be a point cloud, and the localization can include finding visually similar features among the 3D model and the image data and computing a geometric relation among the similar features to determine the 6DOF image localization.

The method may further include receiving location image data and constructing the 3D model from the location image data. The location image data can include RGB image data and depth data.

According to an embodiment, the method further includes receiving a plurality of image data, which includes the image data, and a plurality of transmitter measurement data, which includes the transmitter measurement data, from a plurality of devices, which includes the device.

Devices can be mobile devices, such a mobile phones. The devices can be of crowdsource users.

In an embodiment, the method further includes performing RSSI fingerprint based localization using the fingerprint database and the calibrated RF propagation model.

Another embodiment of the present invention provides a system having a processor and a memory. The memory stores processor executable instructions that, when executed by the processor, cause the processor to perform the following operations for wireless localization data acquisition and calibration: receive image data and transmitter measurement data from a device; localize the image data in a visual 3D model to determine a device location in a physical space; and use the device location and the transmitter measurement data to perform at least one of: determine transmitter fingerprint localization data and storing the transmitter fingerprint localization data in a fingerprint database; or calibrate a radio frequency (RF) propagation model for proximity estimation.

Localizing the image data can include performing six degrees of freedom (6DOF) image localization. The visual 3D model can be a point cloud, and the localization can include finding visually similar features among the 3D model and the image data and computing a geometric relation among the similar features to determine the 6DOF image localization.

The operations can further include performing RSSI fingerprint based localization using the fingerprint database and the calibrated RF propagation model.

Another embodiment of the present invention provides a non-transitory computer-readable medium having code for configuring one or more processors to: receive image data and transmitter measurement data from a device; localize the image data in a visual 3D model to determine a device location in a physical space; and use the device location and the transmitter measurement data to perform at least one of: determine transmitter fingerprint localization data and storing the transmitter fingerprint localization data in a fingerprint database; or calibrate a radio frequency (RF) propagation model for proximity estimation.

The visual 3D model can be a point cloud, and the localization operation can include finding visually similar features among the 3D model and the image data and computing a geometric relation among the similar features to determine six degrees of freedom image localization.

FIG. 1 shows variances in RSSI values in a lab environment for different distances and from different phone models. RSSI varies by 20 dBm between models at the same distance. As such, RSSI based proximity estimation faces the following challenge: high hardware and environment dependency requires a calibration of the signal propagation model to the deployment environment.

As described below, the 6DOF image localization of embodiments of the present invention enables localization systems to overcome the above-discussed challenges.

Figure 2:
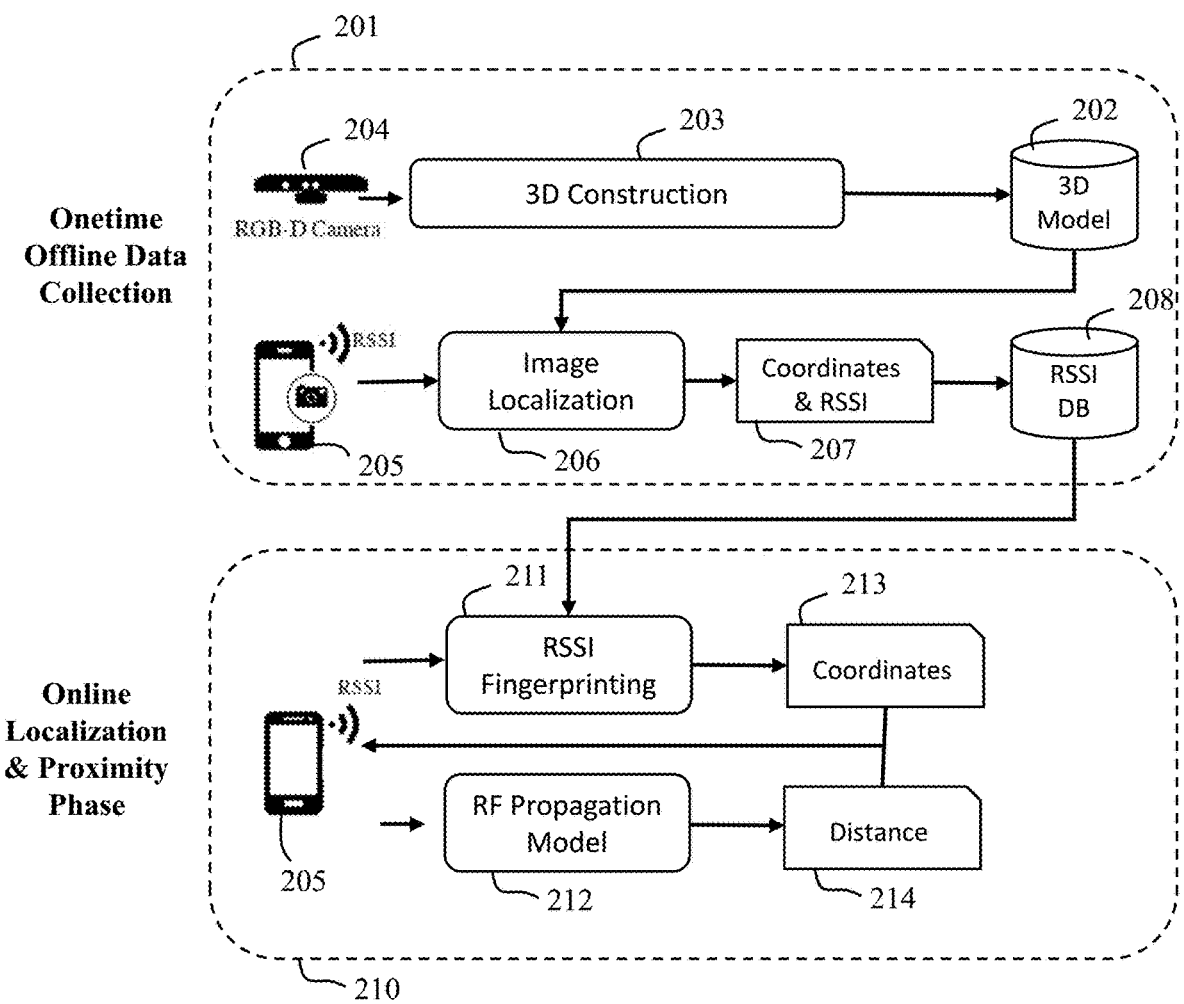
FIG. 2 illustrates a method and system for 3D model supported RSSI fingerprinting and proximity estimation according to an embodiment.

FIG. 2 depicts an embodiment of the present invention. During an offline phase 201, a visual 3D model 202 is constructed 203 using a RGB-D camera 204 (an RGB-D camera combines RGB image data with depth data). A mobile device (e.g., a mobile phone) 205 of users collects RSSI values from the surrounding wireless transmitters (e.g., WiFi access points or Bluetooth beacons). The users provide RSSI values and the images taken from the camera of their mobile device 205. Embodiments localize 206 the images in the visual 3D model 202, which gives the location (e.g., coordinates) of the user's mobile phone 205 in the physical space.

For fingerprinting, a measurement 207 contains the RSSI values of the transmitters by the mobile device 205, the model of the mobile device 205, and the location of the user (e.g., coordinates of the mobile device 205). The measurement 207 is then saved to the database 208. After a measurement 207 has been stored (e.g., after the offline phase 201), subsequent users of embodiments of the present system can use a purely RSSI fingerprinting based localization approach that does not require any more images to be taken (e.g., in the online phase 210). For RSSI proximity estimation, embodiments obtain transmitter-receiver distances from the 3D model 202 to calibrate the RF propagation model 212 to the phone hardware and environment.

As shown in FIG. 2, the system constructs 208 a 3D model 202 using a RGB-D camera 204 and subsequently uses this 3D model 202 for RF localization data acquisition and calibration by combining image localization with RSSI sampling on end-user devices 205.

In the online phase 210 of an embodiment, a mobile device 205 uses RSSI fingerprinting 211 to obtain coordinates 213 from the RSSI database 208 based on measurements 207 taken in the offline phase 201. The mobile device 205 also uses the calibrated RF propagation model 212 to determine distances 214 from the coordinates 213 of the wireless transmitters associated with the RSSI fingerprints. The mobile device 205 can then use this information to determine information about its location in physical space.

6DOF Image Localization: Vision based localization localizes camera images in an existing 3D model (e.g., 3D model 202). To infer the location of a query image, it localizes the query image in the 3D model using the most likely location (3DOF) and angle (3DOF). To localize an image, embodiments build a 3D model, which is essentially a set of 3D points (a.k.a., a point cloud). Some points in the 3D model are associated with a visual feature (e.g., SIFT, SURF) that describes the appearance around it. Embodiments find the most similar visual features in the 3D model from those extracted in the image, and compute the geometry relation among them to get the 6DOF the image. As a person of ordinary skill in the art would understand, determining which features are similar may be performed in a variety of ways, including performing a best fit algorithm or finding a point cloud that has the smallest deviation from a portion of a point cloud in the 3D model.

Figure 3:
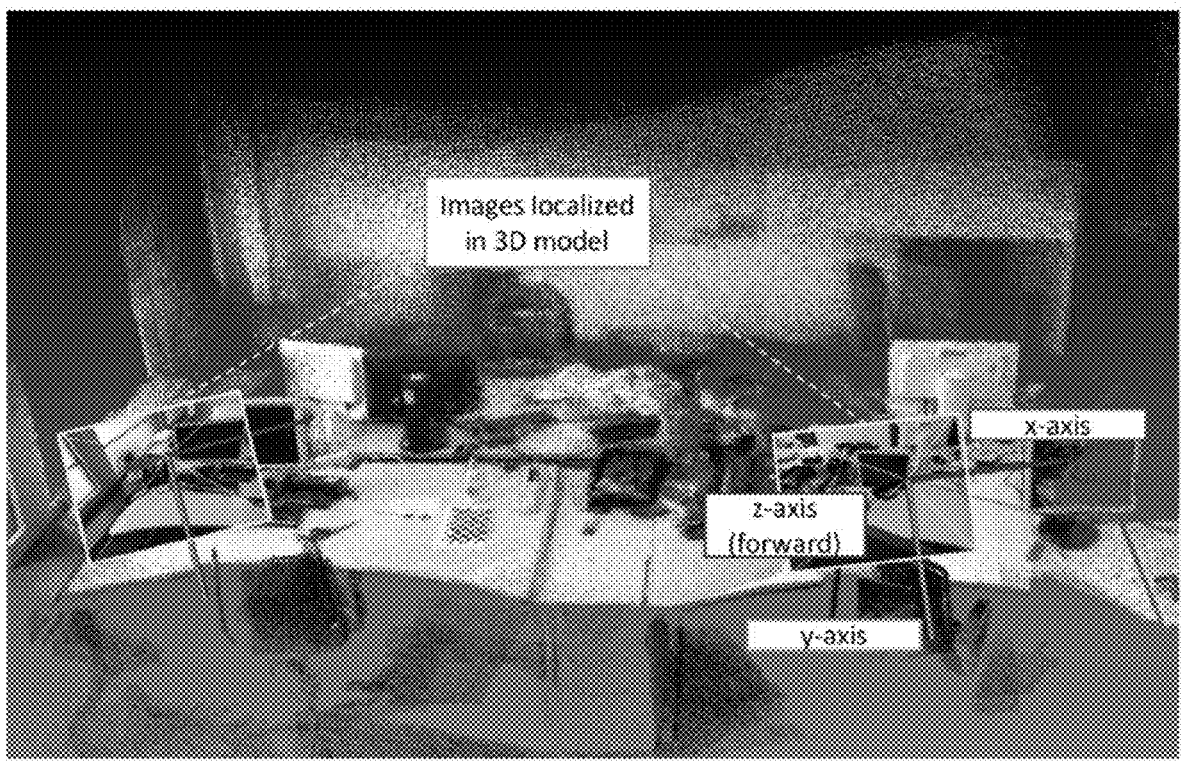
FIG. 3 illustrates an exemplary embodiment, showing two images localized in a 3D model.

An embodiment of the present invention uses RTAB-Map to build the 3D model, and uses SnapLink for image localization (however the invention is not so limited, and other mapping software, such as other 3D point cloud generators, and other image localization software can be used). As an example, FIG. 3 shows a 3D model and two images localized at the location and orientation where they were taken in the real world. In FIG. 3, each image has its own coordinate system, which is annotated in the figure.

Interpretation of 3D Model and 6DOF Locations Image localization allows embodiments to estimate location in the form of 3D coordinates in a 3D model. However, applications that use the localization services still need to know how to interpret these coordinates in the context of the corresponding 3D model. Fortunately, 3D point clouds are easy to label by humans, and many algorithms can be used to understand semantics in 3D point cloud automatically. For example, embodiments can perform scene understanding on the point cloud, such as detecting doors, obstacles, and pathway for indoor navigation. Embodiments can also perform 3D registration to combine room 3D models together to form a 3D model of the building, which allows localization applications to operate at the scale of a building.

Figure 4:
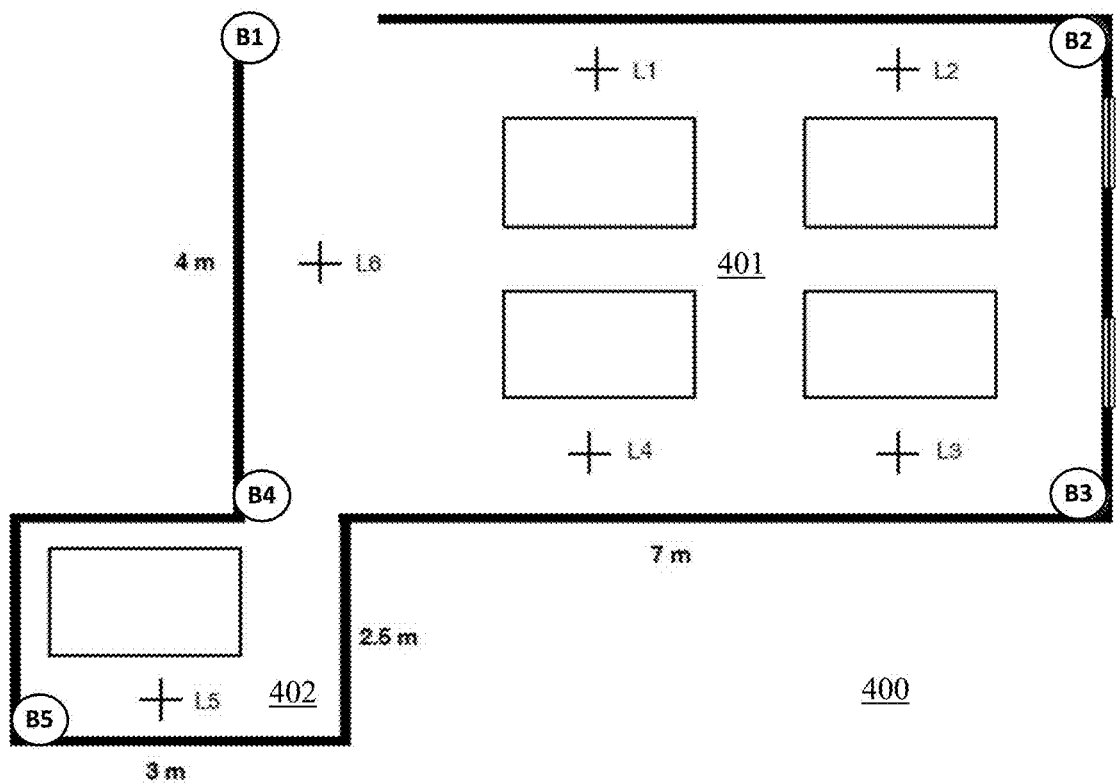
FIG. 4 illustrates an experimental setup for fingerprinting experiments.

An example embodiment of a system of the present invention as shown in FIG. 4 is deployed in a shared office space 400 with two rooms 401, 402. In the example embodiment of FIG. 4, in total five Bluetooth beacons (here, Estimote Beacons are used) B1-B5 are deployed in the corners of the rooms 401, 402 at around 1:5 m height. The system then collects a visual 3D model. In the example embodiment, the system collects the visual 3D model with a Microsoft Kinect, using RTABMap. In the embodiment, a Nexus 5x Android phone is used collect pictures and RSSI samples at six locations in the rooms L1-L6. Further, the system re-collects RSSI samples for 7 days to evaluate the stability of the approach taken by the embodiment.

For RSSI fingerprinting, the embodiment implements a simple Euclidean distance based approach following the system outlined in. Specifically, to localize a device, the example embodiment matches the sampled RSSI values to the closest set of RSSI values stored in the fingerprinting database. The example embodiment uses the median of sampled RSSI values to remove outliers.

For RSSI proximity estimation, the example embodiment uses a log-distance path loss model given by the following equation:

$$d = 10\left(\frac{P_{tx} - P_{rx}}{10 * \gamma}\right) \quad \text{Equation 1}$$

The log-distance path model defines the relation of a transmitter-receiver distance and perceived signal strength. In the above equation, d is the estimated distance between mobile device and transmitter, γ is the path loss component—which determines the rate of decay of the RSSI values when moving away from the transmitter, $P_{rx}$ is the received signal strength, and $P_{tx}$ is the signal strength at 1 m. As such, γ captures the effects of the environment (e.g., obstacles in line of sight result in faster decay), whereas $P_{tx}$ captures hardware effects on transmitter and receiver side (SoC implementation, amplifier and antenna).

In embodiments of the present invention, Equation 1 is solved by obtaining transmitter-receiver distance characteristics through 6DOF image localization in an existing 3D model together with received signal strength indication at that location. This enables the system to calibrate a distance model for the specific transmitter and receiver hardware and for the specific environment. Embodiments of the present invention are not limited to the log-distance path model and can also be applied to other signal propagation models.

The example embodiment then calibrates γ and $P_{tx}$ through image localization in the 3D model. In the example embodiment, two distances $d_0$ and $d_1$ are obtained from the 3D model and Equation 1 is solved for both unknown variables. Due to variations in signal propagation in indoor environments (e.g., multipath, obstacles), there exists no single solution that perfectly solves Equation 1 for multiple distances. The example embodiment minimizes the mean square error for multiple distances as shown in Equation 2 and Equation 3:

$$err_i = 10\left(\frac{P_{tx} - P_{i_{rx}}}{10 * \gamma_i}\right) - d \quad \text{Equation 2}$$

$$err_{total} = \sum_{i=0}^{n} err_i^2 \quad \text{Equation 3}$$

To evaluate the approach of the example embodiment, experiments were performed to evaluate the localization accuracy that embodiments can obtain with the visual 3D model (offline phase). The resulting RSSI fingerprinting is separately evaluated based localization and RSSI based proximity estimation (online phase).

Visual Image Localization: To estimate the localization error using the visual 3D model, 50 images were collected at the same location but having different angles. This was done for all six locations (L1-L6) marked in FIG. 4. SnapLink was then used to localize the images in the 3D model.

Figure 5:
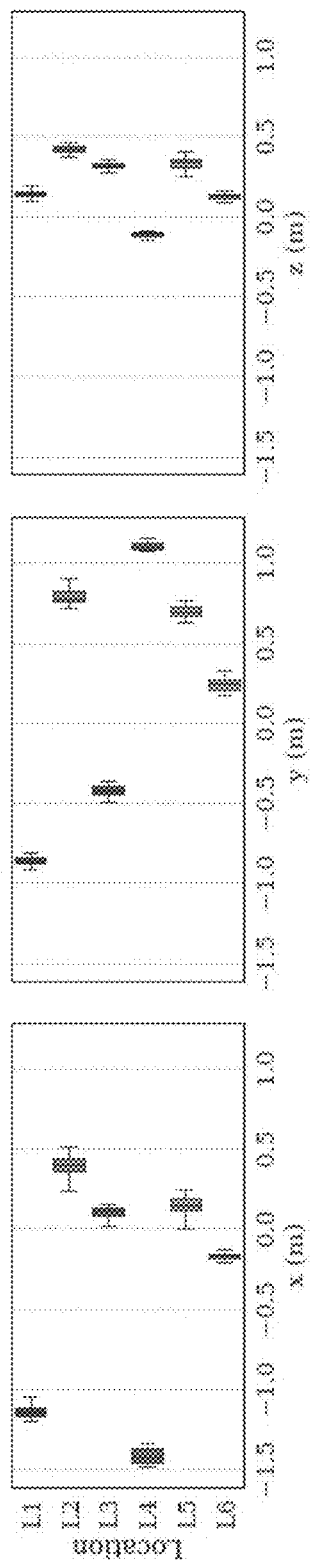
FIG. 5 illustrates visual localization results for the successfully localized images at different locations (L1-L5). x, y and z are coordinates in 3D space.

FIG. 5 shows the result of this experiment by depicting x, y and z coordinates for each location. This data is based on multiple 3D models. Locations with similar coordinates are not necessarily physically close to each other. Out of 313 images, only 16 (5%) failed to be localized in the example embodiment, due to noise in the images and the 3D model and the thresholds set in the system, which is not uncommon in state-of-the-art image localization systems.

For 95% of the images, image localization achieves highly accurate results (empirically verified for the results in the 3D model as shown in FIG. 3). These successfully localized images exhibit only a small standard deviation (SD): $x_{SD}$=4:3 cm, $y_{SD}$=4:7 cm, $z_{SD}$=4:6 cm. Overall, experimental results show that image localization of embodiments provides high accuracy and can be used as the near-ground-truth input for RF based localization systems.

RSSI Fingerprinting Localization: RSSI samples are collected at locations (L1-L6) over the timeframe of a week (10 different dates and times). The initial collection of RSSI data were used as training data to build a fingerprinting database where the median RSSI value for each location is stored. Then, the example embodiment system was tested with the remaining 9 data sets.

Figure 6:
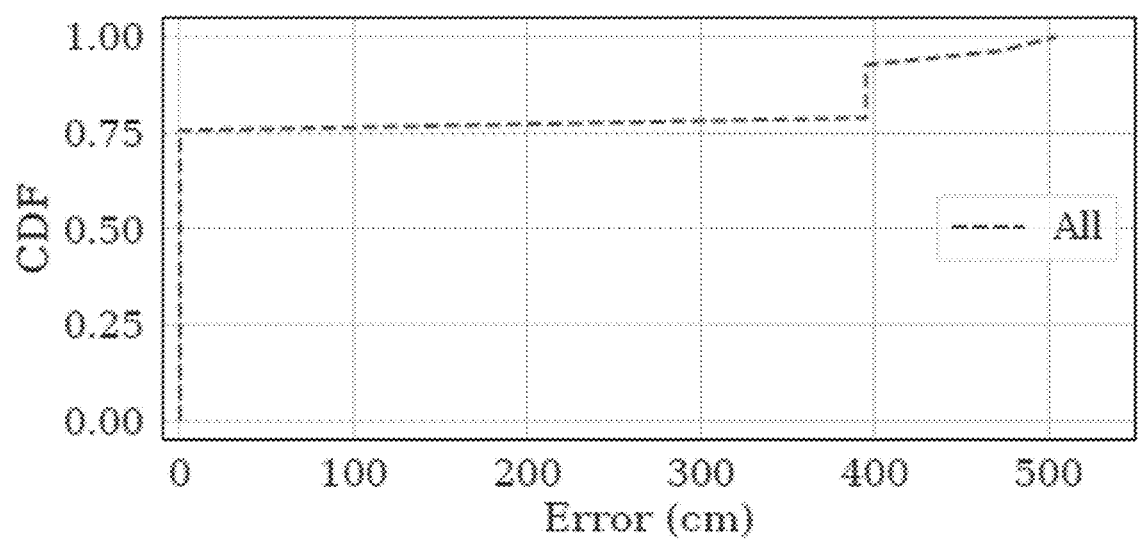
FIG. 6 illustrates CDF of overall localization errors.
Figure 7:
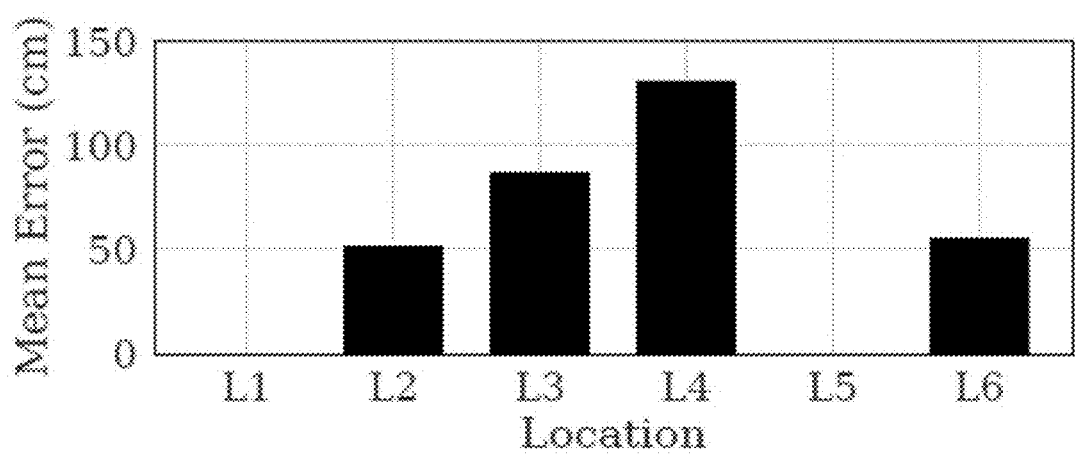
FIG. 7 illustrates mean localization error for each location.

FIG. 6 depicts the cumulative distribution function (CDF) of the localization errors for all locations together, while FIG. 7 shows results for each location separately. Most collected samples are localized correctly (75%). As expected, due to the close proximity of some locations (e.g., <2 m for L3 and L4) and changes in time in RF signal propagation (e.g., due to human activity, WiFi traffic), some localization attempts result in wrong locations.

RSSI based Proximity Estimation. To evaluate vision based RSSI calibration, a single BLE beacon was placed in a larger conference room at the height of 1:5 m and then a 3D model was built using RTAB-Map. The beacon location was manually selected in the 3D model using a labeling tool. RSSI data was collected at five transmitter-receiver distances (1 m, 3 m, 5 m, 7 m and 10 m) and with multiple phone models, together with images captured by the smartphone camera. The 3D model was used to localize the captured images and calculate the beacon-camera distances.

Figure 9:
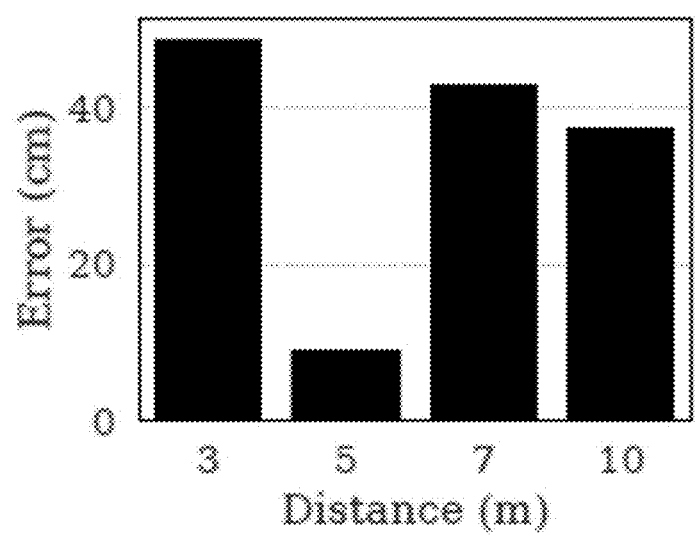
FIG. 9 illustrates distance estimation error from image localization.

FIG. 9 depicts the visual distance error for different camera-beacon distances based on 20 images per location. Note that results for 1 m are omitted because image localization does not work reliably due to the specific deployment environment of the example embodiment (the beacon is placed on the wall and images captured at 1 m distance do not contain enough SURF features for reliable localization). Overall, accurate distance estimations are derived from the 3D model for the remaining locations (mean error: 33 cm).

The collected RSSI data at two locations ($P_{0_{rx}}$; $P_{1_{rx}}$) and the distances $d_0$ and $d_1$ obtained from the 3D model are then used for these locations to minimize the overall error in Equation 3 for a (γ, $P_{tx}$) pair. The Nelder-Mead algorithm is used to solve this multidimensional unconstrained optimization problem. A single set of RSSI values is used for this calibration phase, and the approach of the example embodiment is tested with solely RSSI data collected in a consecutive sampling iteration.

Figure 8:
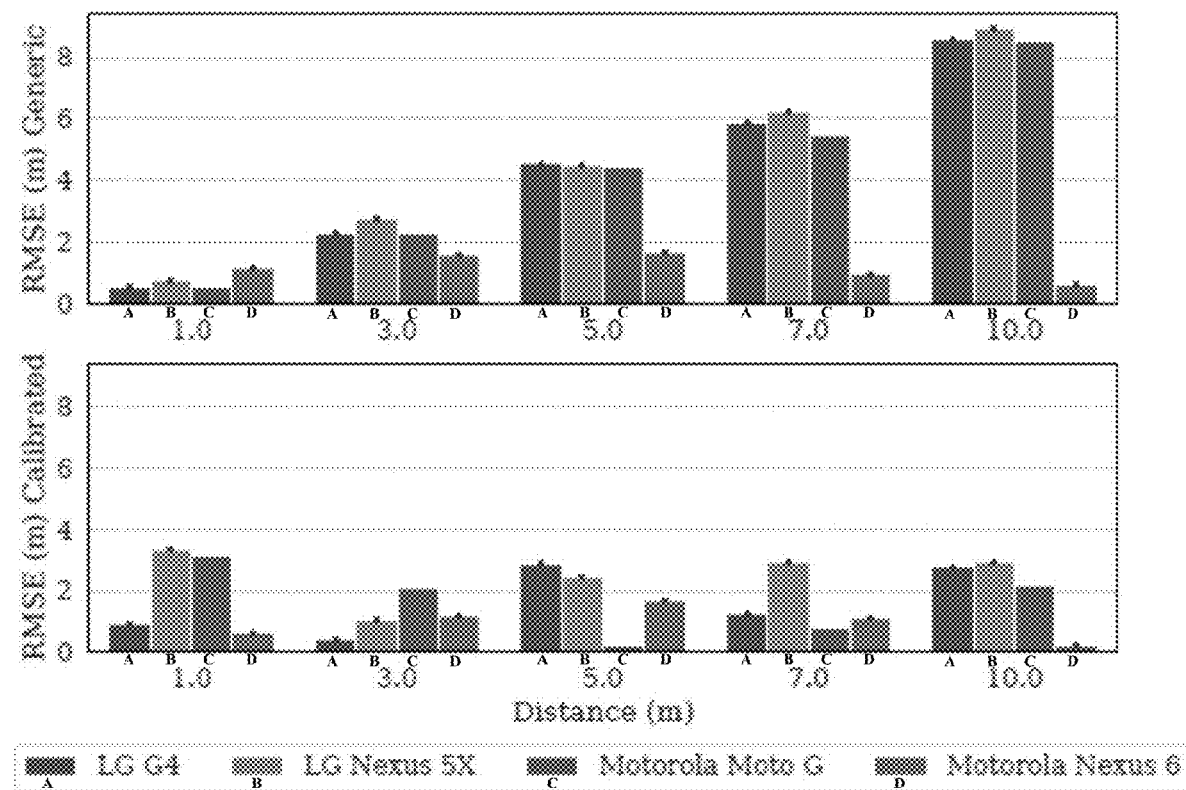
FIG. 8 illustrates RSSI based proximity estimation using a generic (top) and a calibrated (bottom) RF signal propagation model.

FIG. 8 depicts (top), the generic proximity estimation results (using the $P_{tx}$), as advertised by the beacon (−74 dBm), and an environment factor γ=1:7, based on empirical data for non-residential buildings; and (bottom) the results after calibration to phone model and environment through image localization in the 3D model using $d_0$=7 m and $d_1$=10 m. The generic model fails to capture phone model and environment characteristics (root mean square error: 3:3 m), while the calibrated model captures device and environment characteristics better (root mean square error: 1:7 m). The error in the calibrated model may be reduced by creating a more accurate model that includes additional environmental factors (e.g., obstacles, other transmitters).

The evaluation of the example embodiment shows the advantages of using image localization to support wireless localization data acquisition and calibration. The combination of the present invention can be applied in several different directions. Because the 3D model contains the full geometry (e.g., room sizes, walls, furniture etc.), this information can be utilized to build a more accurate RF propagation model for localization applications. Crowdsourcing, together with the structure from motion (SfM) can be employed to build the model from pictures without depth information. This would remove the current one-time effort of 3D reconstruction using a RGB-D camera and allow for updating the model to environment changes. However, it would also result in a sparser point cloud. Fiducial markers (e.g., AprilTag) may also be deployed that allow a camera to directly localize itself in space without requiring a 3D model.

As discussed, embodiments use image localization in a 3D model to automate data collection and calibration in RSSI based localization systems. Image localization may not be used in daily activities in shared environments because of privacy concerns and its heavy energy overhead. However, using image localization can eliminate human efforts in the data acquisition and calibration phases of other localization systems. For example, traditional RSSI fingerprinting has a resource intensive site survey phase.

An embodiment of the present invention provides a system using crowdsourced RSSI fingerprinting database construction using user cameras (e.g., from user smartphones, smart glasses, etc.) and 6DOF image localization.

Embodiments of the present invention apply 6DOF image localization of user-captured images in an existing 3D model. Embodiments use the obtained location, with RF signals captured (e.g., captured simultaneously), to incrementally construct an RSSI fingerprinting database. This database can then be used for pure RF based localization (which is not computationally intense).

Figure 10:
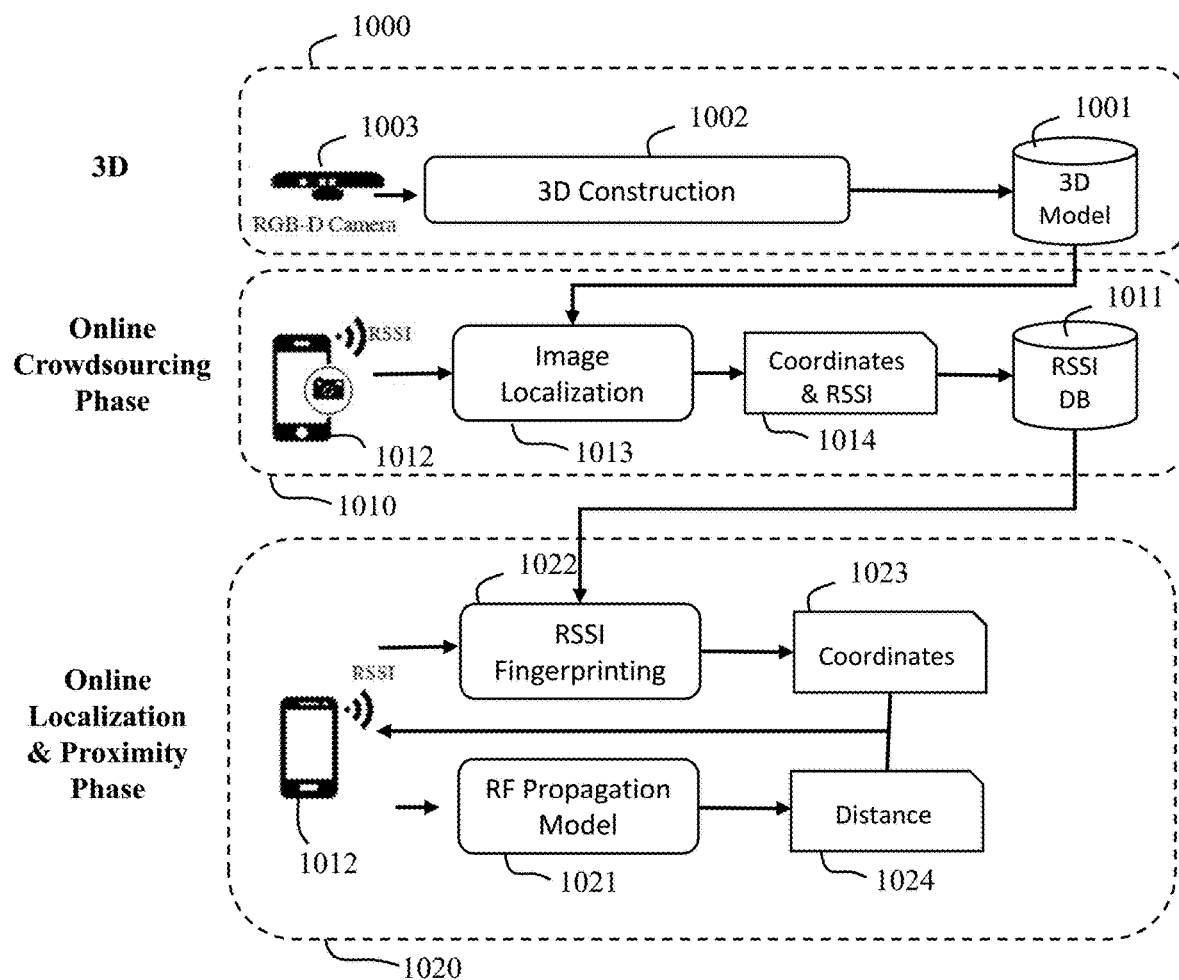
FIG. 10 illustrates an embodiment of the present invention using a crowdsourcing methodology.

FIG. 10 illustrates an embodiment of the present invention using a crowdsourcing methodology.

In a 3D model constructions phase 1000, a 3D model 1001 is constructed 1002 using a camera 1003 (e.g., a RGB-D camera). Other 3D model construction techniques, such as sparse point cloud construction through crowdsourced images, are within the scope of embodiments of the present invention. Embodiments of the present invention can use a variety of 3D construction algorithms 1002 to build the 3D model 1001 using data from the camera 1003, as would be recognized by a person of ordinary skill in the art.

In the online crowdsourcing phase 1010, the 3D model 1001 is used to build the RSSI fingerprinting database 1011 and (calibrate) the RF propagation model 1021. Mobile devices 1012 of the crowdsourced users construct the RSSI database 1011 by capturing RSSI fingerprint data and images. The system applies 6DOF image localization 1013 to the images captured by the crowdsourced user's mobile device 1012 using the 3D model 1001. Embodiments use the obtained location (from the image localization 103), with RF signals captured (e.g., captured simultaneously by the mobile device(s) 1012), to incrementally construct the RSSI fingerprinting database 1011. The system improves RSSI based proximity estimation error by using the image localization data to calibrate the RF signal propagation model 1021 (e.g., to the specific phone and environment).

In the online localization phase 120, users can be localized purely by radio frequency signals and transmitter-receiver distance determined accurately through the calibrated RF propagation model 1021.

Figure 11:
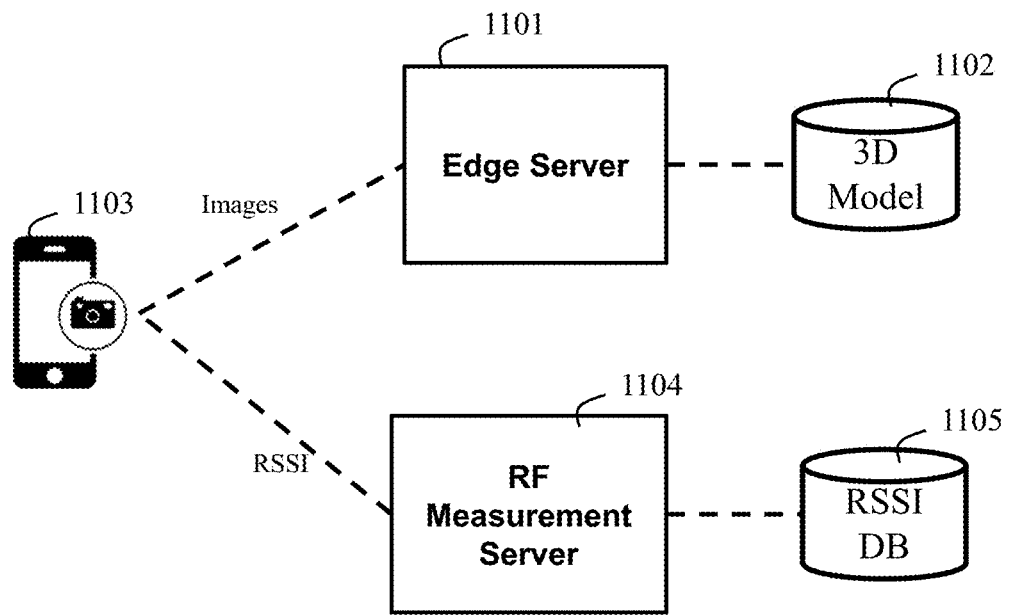
FIG. 11 illustrates system architecture at an edge according to an embodiment.

FIG. 11 illustrates a system architecture at an edge according to an embodiment.

In an embodiment, a local edge server 1101 stores the 3D model 1102 and enables low-latency computation for outsourced 6DOF image localization, while preserving user privacy and saving energy of the user device 1103.

The crowd-sourced images can be used to detect changes in the physical environment and then be used to update the 3D model to environment changes.

In an embodiment, the system provides for transfer of RF characteristics (obtained from 6DOF image localization) between similar user devices and similar environments. The system may compare 3D models to find similar environments to re-use/transfer existing fingerprinting data and RF environment characteristics. For example, a user device 1103 may communicate with an RF measurement server 1104 to re-use/transfer existing RSSI fingerprint data from a RSSI database 1105. The system may compare receiver/transmitter characteristics to find similar receivers to re-use/transfer RF receiver/transmitter characteristics for different environments.

In embodiments, the system compares 3D (sub-)models (e.g., of different rooms) to find visually similar environments to re-use/transfer existing fingerprinting data and RF environment characteristics between environments that exhibit similar RF characteristics.

Embodiments may also compare receiver/transmitter characteristics to find similar receivers/transmitters to then re-use/transfer RF receiver/transmitter characteristics for different environments (e.g., two smartphone models exhibit similar RF characteristics allows us to re-use/transfer these characteristics between them.).

Figure 12:
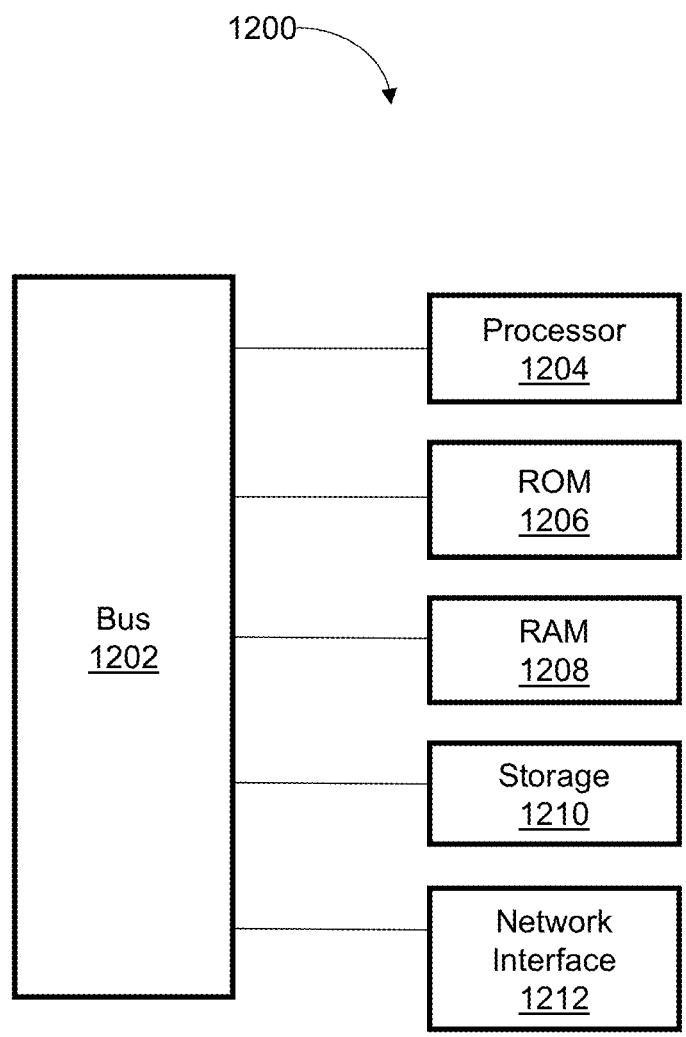
FIG. 12 is a block diagram of a processing system according to an embodiment.

FIG. 12 is a block diagram of a processing system according to an embodiment. The processing system 1200 can be used to implement the protocols, devices, mechanism, systems and methods described above. The processing system 1200 includes a processor 1204, such as a central processing unit (CPU) of a computing device or a distributed processor system. The processor 1204 executes processor executable instructions comprising embodiments of the system for performing the functions and methods described above. In embodiments, the processor executable instructions are locally stored or remotely stored and accessed from a non-transitory computer readable medium, such as storage 1210, which may be a hard drive, cloud storage, flash drive, etc. Read Only Memory (ROM) 1206 includes processor executable instructions for initializing the processor 1204, while the random-access memory (RAM) 1208 is the main memory for loading and processing instructions executed by the processor 1204. The network interface 1212 may connect to a wired network or cellular network and to a local area network or wide area network, such as the Internet.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The following articles are hereby incorporated by reference herein in their entirety: Kaifei Chen, Jonathan First, John Kolb, Hyung-Sin Kim, Xin Jin, David E. Culler and Randy H. Katz, "SnapLink: Fast and Accurate Vision-Based Appliance Control in Large Commercial Buildings," in Proceedings of the ACM on Interactive, Mobile, Wearable and Ubiquitous Technologies, Vol. 1, No. 4, Article 129, (December 2017); Jiang Dong Yu Xiao Marius Noreikis Zhonghong Ou Antti Ylä-Jääski, "iMoon: Using Smartphones for Image-based Indoor Navigation," SenSys'15 (Nov. 1-4, 2015); Sameer Agarwal, Noah Snavely, Ian Simon, Steven M. Seitz, and Richard Szeliski, "Building Rome in a Day," Twelfth IEEE International Conference on Computer Vision (ICCV September 2009); and Philipp Bolliger, "Redpin—Adaptive, Zero-Configuration Indoor Localization through User Collaboration," MELT'08 (Sep. 19, 2008).

What is claimed is:

1. A method for wireless localization data acquisition and calibration, the method comprising:
   receiving image data and transmitter measurement data from a device;
   automatically obtaining device location data by localizing the image data in a pre-constructed visual 3D model of a physical space to determine an estimation of a location of the device in the physical space; and
   using the device location data and the transmitter measurement data to perform:
      automatically determining transmitter fingerprint localization data by associating the device location data with the transmitter measurement data and storing the transmitter fingerprint localization data in a fingerprint database; and
      automatically calibrating a radio frequency (RF) propagation model for proximity estimation based on the device location data and the transmitter measurement data.

2. The method according to claim 1, wherein the transmitter fingerprint localization data comprises an RSSI value of a transmitter determined by the device, device characteristics of the device, and the device location.

3. The method according to claim 1, wherein localizing the image data comprises performing six degrees of freedom (6DOF) image localization.

4. The method according to claim 3, wherein the visual 3D model is a point cloud, and wherein localization comprises finding visually similar features among the 3D model and the image data and computing a geometric relation among the similar features to determine the 6DOF image localization.

5. The method according to claim 1, the method further comprising, prior to performing the operation of localizing the image data, receiving location image data of the physical space, and constructing the 3D model of the physical space from the location image data.

6. The method according to claim 5, wherein the location image data comprises RGB image data and depth data.

7. The method according to claim 1, the method further comprising receiving a plurality of image data, which comprises the image data, and a plurality of transmitter measurement data, comprising the transmitter measurement data, from a plurality of devices, comprising the device.

8. The method according to claim 7, wherein the devices are mobile devices of crowdsource users.

9. The method according to claim 1, the method further comprising performing RSSI fingerprint based localization using the fingerprint database and the calibrated RF propagation model.

10. A system comprising a processor and a memory, the memory comprising processor executable instructions that, when executed by the processor, cause the processor to perform the following operations for wireless localization data acquisition and calibration:
   receive image data and transmitter measurement data from a device;
   automatically obtain device location data by localizing the image data in a pre-constructed visual 3D model of a physical space to determine an estimation of a location of the device in the physical space; and
   use the device location data and the transmitter measurement data to:
      automatically determine transmitter fingerprint localization data by associating the device location data with the transmitter measurement data, and storing the transmitter fingerprint localization data in a fingerprint database; and
      automatically calibrate a radio frequency (RF) propagation model for proximity estimation based on the device location data and the transmitter measurement data.

11. The system according to claim 10, wherein localizing the image data comprises performing six degrees of freedom (6DOF) image localization.

12. The system according to claim 11, wherein the visual 3D model is a point cloud, and wherein localization comprises finding visually similar features among the 3D model and the image data and computing a geometric relation among the similar features to determine the 6DOF image localization.

13. The system according to claim 10, the operations further comprising performing RSSI fingerprint based localization using the fingerprint database and the calibrated RF propagation model.

14. A non-transitory computer-readable medium comprising code for configuring one or more processors to:
   receive image data and transmitter measurement data from a device;
   automatically obtain device location data by localizing the image data in a pre-constructed visual 3D model of a physical space to determine an estimation of a location of the device in the physical space; and
   use the device location data and the transmitter measurement data to:
      automatically determine transmitter fingerprint localization data by associating the device location data with the transmitter measurement data, and storing the transmitter fingerprint localization data in a fingerprint database; and
      automatically calibrate a radio frequency (RF) propagation model for proximity estimation based on the device location data and the transmitter measurement data.

15. The computer-readable medium according to claim 14, wherein the visual 3D model is a point cloud, and wherein localization comprises finding visually similar features among the 3D model and the image data and computing a geometric relation among the similar features to determine six degrees of freedom image localization.

* * * * *